United States Patent
Turney

(10) Patent No.: US 12,248,607 B2
(45) Date of Patent: Mar. 11, 2025

(54) SYSTEM AND METHOD FOR EXCHANGE OF DATA WITHOUT SHARING PERSONALLY IDENTIFIABLE INFORMATION

(71) Applicant: LiveRamp, Inc., San Francisco, CA (US)

(72) Inventor: Collin Turney, Benton, AR (US)

(73) Assignee: LiveRamp, Inc., San Francisco, CA (US)

( * ) Notice: Subject to any disclaimer, the term of this patent is extended or adjusted under 35 U.S.C. 154(b) by 211 days.

(21) Appl. No.: 18/023,285

(22) PCT Filed: Aug. 6, 2021

(86) PCT No.: PCT/US2021/044985
§ 371 (c)(1),
(2) Date: Feb. 24, 2023

(87) PCT Pub. No.: WO2022/051056
PCT Pub. Date: Mar. 10, 2022

(65) Prior Publication Data
US 2023/0315901 A1    Oct. 5, 2023

Related U.S. Application Data

(60) Provisional application No. 63/074,295, filed on Sep. 3, 2020.

(51) Int. Cl.
G06F 21/62    (2013.01)
G06F 21/60    (2013.01)

(52) U.S. Cl.
CPC ........ G06F 21/6245 (2013.01); G06F 21/602 (2013.01)

(58) Field of Classification Search
CPC .......................... G06F 21/6245; G06F 21/602
See application file for complete search history.

(56) References Cited

U.S. PATENT DOCUMENTS 6,523,041 B1    2/2003  Morgan et al.
8,639,920 B2    1/2014  Stack et al.
(Continued)

FOREIGN PATENT DOCUMENTS

EP    3040898 A1    7/2016

OTHER PUBLICATIONS

NPL Search Terms (Year: 2024).*
(Continued)

Primary Examiner — Syed A Zaidi

(57) ABSTRACT

A system provides for a client to receive enhancement data without having personally identifiable information leave its systems. The system receives access to a client configuration and a data graph to perform configuration defined filtering and aggregation steps to produce a set of client files. These files contain a hashed version of PII from the data graph. They are then used by the client to match the identity of its population of objects to keys, the keys also being included in the set of client files. The client associates corresponding keys with objects in its own data graph, then requests enhancement data using only the keys. The data is returned using the matched keys without the use of personally identifiable information.

20 Claims, 2 Drawing Sheets

(56) References Cited

U.S. PATENT DOCUMENTS

| | | |
|---|---|---|
| 8,838,629 B2 | 9/2014 | Dedeoglu et al. |
| 9,037,637 B2 | 5/2015 | Jaye et al. |
| 9,288,184 B1 | 3/2016 | Kvamme et al. |
| 9,355,273 B2 | 5/2016 | Stevens et al. |
| 9,608,810 B1* | 3/2017 | Ghetti ................ H04L 63/0428 |
| 9,760,697 B1 | 9/2017 | Walker |
| 10,044,654 B2 | 8/2018 | Papa et al. |
| 10,055,747 B1 | 8/2018 | Sherman et al. |
| 10,496,847 B2 | 12/2019 | Fineman et al. |
| 11,120,144 B1* | 9/2021 | Kassam-Adams .... H04L 9/0643 |
| 11,620,673 B1* | 4/2023 | Paquette ............ G06Q 30/0242 |
| | | 705/14.41 |
| 2006/0080554 A1* | 4/2006 | McDonald .......... G06F 21/6254 |
| | | 713/189 |
| 2010/0036884 A1 | 2/2010 | Brown |
| 2013/0125202 A1* | 5/2013 | Sprague ................ H04L 63/105 |
| | | 726/1 |
| 2013/0318347 A1* | 11/2013 | Moffat .................. H04L 9/0894 |
| | | 713/168 |
| 2014/0041047 A1 | 2/2014 | Jaye et al. |
| 2014/0177833 A1* | 6/2014 | Helms .............. H04N 21/25816 |
| | | 726/4 |
| 2015/0081562 A1 | 3/2015 | Roullier et al. |
| 2016/0342738 A1 | 11/2016 | Stalling et al. |
| 2017/0140174 A1* | 5/2017 | Lacey ................ G06Q 20/4016 |
| 2023/0059328 A1* | 2/2023 | Roberts .................. G06N 20/20 |

OTHER PUBLICATIONS

NPL Search Terms (Year: 2025).*

Gibson, Neal et al., "TrustEd: A Dual-Database Trusted Broker for Multi-Agency Data," 2013 Int'l Conf. on Social Computing, pp. 999-1004 (Sep. 2013).

Li, Yibin et al., "Intelligent Cryptography Approach for Secure Distributed Big Data Storage in Cloud Computing," Information Sciences (2016).

Chadwick, David W., "Federated Identity Management," Foundations of Security Analysis and Design V, pp. 96-120 (Aug. 30, 2009).

Extended European Search Report for application No. 21864872.3 (issued Aug. 8, 2024).

* cited by examiner

SYSTEM AND METHOD FOR EXCHANGE OF DATA WITHOUT SHARING PERSONALLY IDENTIFIABLE INFORMATION

CROSS-REFERENCE TO RELATED APPLICATIONS

This application claims the benefit of U.S. provisional patent application no. 63/074,295, entitled "Information Exchange without Sharing Personally Identifiable Information," filed on Sep. 3, 2020. Such application is incorporated herein by reference in its entirety.

BACKGROUND

An entity resolution system is a computerized system that operates to process data concerning an entity object and attempts to positively identify that object from among a population of objects. An entity resolution data graph or just "data graph" may be used for this purpose. A data graph is a data structure consisting of a large set of assertions describing a population of objects. In the special case of an identity data graph, these objects may be persons, households (i.e., sets of persons), or businesses. In an identity data graph, the assertions may include personally identifiable information (PII) as well as non-PII attributes. Identity graphs in commercial settings may be very large, including billions of records with hundreds or thousands of attributes (fields) in each record pertaining to an object. Data graphs used in other fields, such as medicine, may similarly include an enormous number of nodes for objects and the corresponding connecting edges. Processing such large data sets presents unique technical challenges.

Retailers and other entities that maintain information about persons, households, or businesses (referred to herein generally as "clients") typically maintain their own internal records containing the information they have collected concerning their own customers. This data may be stored in the form of an identity graph. Often a client may have incomplete information, such that additional information concerning the customers would be valuable. Such information may be used, for example, to specifically tailor or "target" a message from the client (retailer) to its customer and thereby increase the likelihood of a positive response. The client may thus contract with an information services provider to "enhance" its own data with additional data concerning the customers concerning whom the customer has collected data. In order for the enhancement to take place, however, there must be some means by which the information services provider matches objects in its own identity graph to corresponding objects in the client's identity graph. More generally, the information services provider must be able to match persons, households, or businesses between its own data graph and that of the client in order to enhance the client's data. Given the great size of the data sets involved, this is a technically daunting challenge that can involve the transmission of very large amounts of data between the respective parties.

A typical method of performing the matching between the client's data graph and the information service provider's data graph is for the client to transmit an electronic data stream comprising items of personally identifiable information (PII) to the information services provider. The PII (such as name and address) is then used in an algorithmic search in order to match this information. Once a match is made, the information services provider can then identify the enhancement data required by the client. Sending PII to the information services provider, however, creates a risk that this private information could be inadvertently disclosed to third parties. The risk increases because of the very large amount of data that may be transferred in order to perform these data computations. In addition, there are now legal restrictions in a number of jurisdictions that limit the ability of the client to distribute PII within its data graph. For example, the General Data Protection Regulation (GDPR) in the European Union (EU) prohibits clients who collect information about EU citizens from sending any PII concerning those citizens outside of the EU. Thus, for example, a retailer located in the EU that collects information about its customers in the EU could not send PII about those customers to an information services located outside of the EU, such as in the United States (US). If PII is required in order to gain enhancement data and the desired information services provider is located in the US as in this example, the client (retailer) located in the EU is prohibited from receiving those services. For these reasons, it would be desirable to develop a system and method for facilitating the enhancement of a client's identity graph without any items of PII leaving the client's data systems, thereby allowing for the enhancement of the data graph for purposes such as tailoring more relevant messages to customers while also ensuring compliance with all applicable laws, regulations, and rules and safeguarding this PII from inadvertent disclosure due to its transmission between parties.

References mentioned in this background section are not admitted to be prior art with respect to the present invention.

SUMMARY

The present invention is directed to a system and method, such as for example an entity reference file (ERF) system and method, for allowing a client to receive enhancement data and generally to enjoy the benefits of having exchanged PII, without actually having any PII leave its data systems. In certain implementations, the ERF system receives access to a client configuration and the information service provider's data graph and performs configuration defined filtering and aggregation steps in order to produce a set of final client files. These files contain a hashed version of PII from the information service provider's data graph. They are then used by the client to match the identity of its population of objects (users or customers, for example) to keys that are utilized by the information services provider, the keys also being included in the final client files. These keys are unique to each object, such that in the case of consumers there will be a unique key corresponding to each consumer for a given population. A non-limiting example of such a key system is the AbiliTec® link provided by LiveRamp, Inc. of San Francisco, California. Once the client has associated corresponding keys with objects in its data graph, then it can request enhancement data using only the keys, with no PII from the client ever being sent to the information services provider and no PII leaving the confines of the client's firewalled and secure computing systems. The client thus is able to receive enhancement data without revealing any of its own PII to any other party and also is able to receive enhancement data while ensuring compliance with all applicable data privacy laws, rules, and regulations and without risking the inadvertent disclosure of customer PII due to transmission of the data between systems.

These and other features, objects and advantages of the present invention will become better understood from a consideration of the following detailed description of certain embodiments in conjunction with the drawings and appended claims.

DRAWINGS

DESCRIPTION OF CERTAIN EMBODIMENTS

Before the present invention is described in further detail, it should be understood that the invention is not limited to the particular embodiments described herein, and that the terms used in describing the particular embodiments are for the purpose of describing those particular embodiments only, and are not intended to be limiting, since the scope of the present invention will be limited only by the claims that are presented below.

Figure 1:
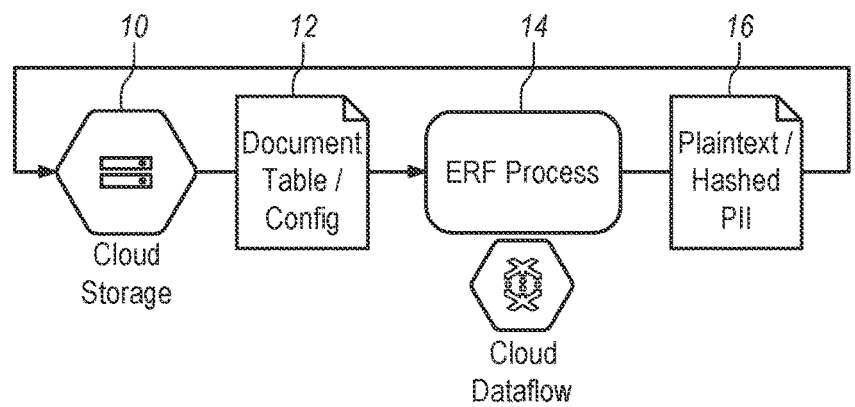
FIG. 1 is a system diagram according to an implementation of the present invention.

FIG. 1 provides an architectural overview of the design of a system according to an implementation of the invention. A document table/config 12 kept in a cloud storage environment 10 is used to drive the entity reference file (ERF) process 14. The result of this ERF process 14 is the client files that the client can use to match the identity of the population within its data graph to keys used by the information services provider. In a typical example, the document table/config file 12 defines how the document should be filtered and aggregated. A cross-reference (XREF) table 20 (shown in FIGS. 2 and 3) may be created to provide a mapping of the client's preferred key to the provider's preferred key, if those key systems are different. In alternative implementations, XREF table 20 may not be needed if the key systems are the same. In one implementation XREF table 20 is formatted in comma-separated values (CSV) format, which is a delimited text file format in which values are separated by commas. The invention is not so limited, however, and thus other delimited file formats or non-delimited file formats may be used in alternative implementations. The XREF table 20 is not sent to the client, but rather is used internally by the information services provider in order to match its own internal keys with those sent to the client as further described below.

FIG. 1 also shows the use of Google® Cloud Dataflow for a particular implementation of the ERF process. Google® Cloud Dataflow from Google Inc. of Mountain View, California is a managed service that allocates and scales Google® Compute Engine virtual machines (VMs) transparently. In a particular implementation, the ERF process is configured to utilize standard n1-highmem-8 (i.e., 8 vCPUs, 52 GB memory, and 128 GB of persistent disk space) compute instances in such an environment. The Google Cloud Dataflow platform also automatically scales these jobs from anywhere between 128 and 512 of these n1-highmem-8 VM instances. Other cloud or non-cloud platforms could be employed in alternative implementations of the invention, provided that they support workflows comprising extremely large data sets as typically required for implementations of the invention.

The following example demonstrates a JSON ERF configuration data file to implement document table/config 12 that may be created quickly in order to facilitate a hashed PII exchange with a client as will be described following.

```
{
  "documentFilter" : {
    "erfRestricted": true
  },
  "outputFields": [
    {
      "name": "CID",
      "internalName": "cl16",
      "domain": "XXXX",
      "salt": "XXXXXX",
      "delimiter": ",",
      "hash": "MD5"
    },
    {
      "name": "SHA1_EMAIL",
      "internalName": "email",
      "case": "LOWER",
      "quantity": 10,
      "hash": "SHA1"
    },
    {
      "name": "CL16",
      "internalName": "cl16",
      "domain": "0000",
      "hash": "NONE"
    }
  ],
  "outputFiles": [{
    "fileName": "Hashed_PII_%m01_{S}",
    "layout": [[
      { "name": "SHA1_EMAIL" },
      { "name": "CID" }
    ]],
    "delimiter": ",",
    "numberOfPartitions": 100
  },
  {
    "fileName": "XREF_%m",
    "layout": [[
      { "name": "CID" },
      { "name": "CL16" }
    ]],
    "delimiter": ",",
    "numberOfPartitions": 1,
    "compression": "GZIP"
  }]
}
```

This configuration code consists of three major sections: documentFilter, outputFields and outputFiles. The documentFilter section describes what population should be selected for this ERF. In this case it is the erfRestricted population, which are entities that are only approved for distribution of hashed representations in one implementation. The outputFields section defines which fields are to be accumulated as the ERF process is run on the document table/config 12. Each output field can have its own configuration parameters that define how it should be formatted for the client (also known as normalization). Taking the SHA1_EMAIL field from the example above, the configuration parameters above specify that up to ten emails should be accumulated per individual, those emails should be converted to lowercase prior to hashing, and hashing should be done using the SHA1 hashing algorithm. Other hashing algorithms that are supported in one implementation include MD5, SHA256, SHA384, SHA512, and SHA256HMAC, each of which are well known in the field, although in alternative implementations other hashing algorithms could be employed, whether now known or developed in the future. In addition to email, the example configuration also specifies that two versions of the CL16 (e.g., the key or link such as the AbiliTec® customer link) identifier should be created; one in the 0000 domain which indicates that it should be used as an internal identifier, and another in the client specific XXXX domain. The client identifier field, also known as CID, is also a string concatenated with a salt using a comma delimiter and then hashed using the MD5 hash algorithm. The internal identifiers of the information services provider are not disclosed directly to clients in this particular implementation, since doing so could allow clients to surreptitiously use the identifiers to link their data together in ways that could circumvent privacy regulations and industry best practices regarding protection of consumer privacy. The XREF file 20 is thus maintained internally with the information services provider for this reason. The client-specific identifiers are mapped to the internal identifiers by the information service provider only within its own computing environment using the XREF file 20. In summary, the above ERF configuration has defined how three individual fields should be created: CID, CL16, and SHA1_EMAIL.

The outputFiles section defines how the accumulated output fields should be organized into output files as well as the individual parameters for creating those files. The above configuration specifies two CSV files that should be created as part of this client's ERF process—a Hashed_PII file 16 and the XREF file 20. The filenames are expanded using the current year and month (using expansion of the substring "%m"), as well as the current partition (using expansion of the substring "{S}"). The numberOfPartitions parameter indicates how many output files the final data should be partitioned into. This allows clients to handle multiple smaller files rather than huge individual files, which is useful in the manipulation of extremely large data sets. If this ERF were run in May of 2020 it would distribute the Hashed_PII output data 16 into 100 files called "Hashed_PII_20200501_00000" through "Hashed_PII_20200501_00099". However, there would only be a single XREF file 20 called "XREF_202005" due to the numberOfPartitions parameter being '1' for this file.

With these files generated, generally the Hashed_PII files 16 would then be delivered to the client and the XREF file 20 kept internally within the information services provider. Using the Hashed_PII files 16, the client could then perform the same email normalization (lowercase and SHA1) on its side to match to this file to get a given CID for a match. That CID can then be presented to the information services provider and converted to the internal CL16 identifier. At this point, both parties have resolved that email to a common identifier.

Comparable ERF processes would utilize approximately 350 virtual machines to process the Document Table 18 (i.e., "person documents") dataset in parallel in order to complete this Entity Reference File processing as described above. Each virtual machine in a particular example would be configured to have 8 vCPUs, 52 GB memory, and 128 GB of persistent disk. The entire process would take about 2 to 3 hours to complete in testing performed by the inventors.

Figure 2:
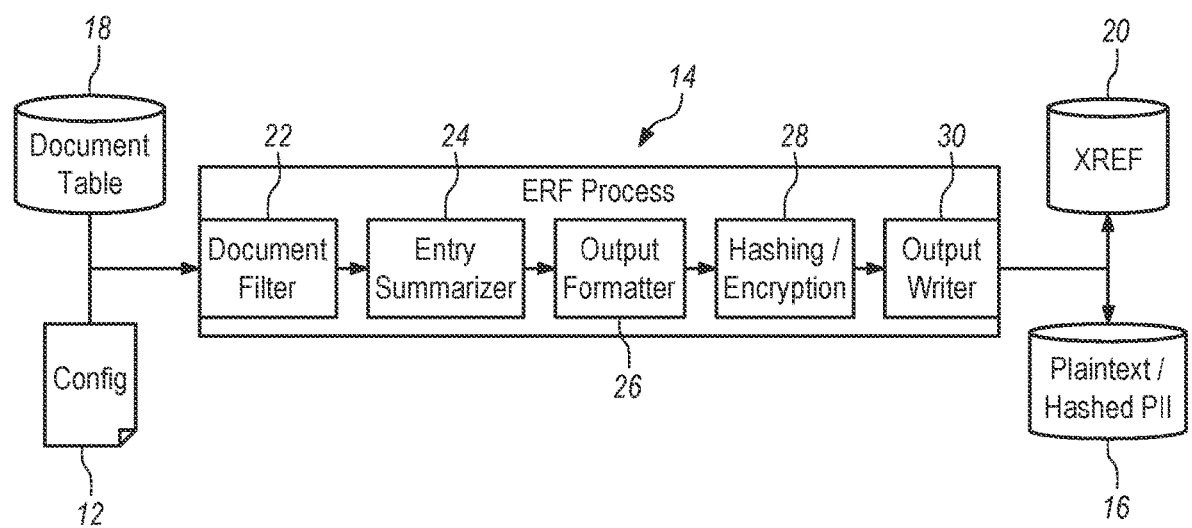
FIG. 2 is a process flow diagram according to an implementation of the present invention.
Figure 3:
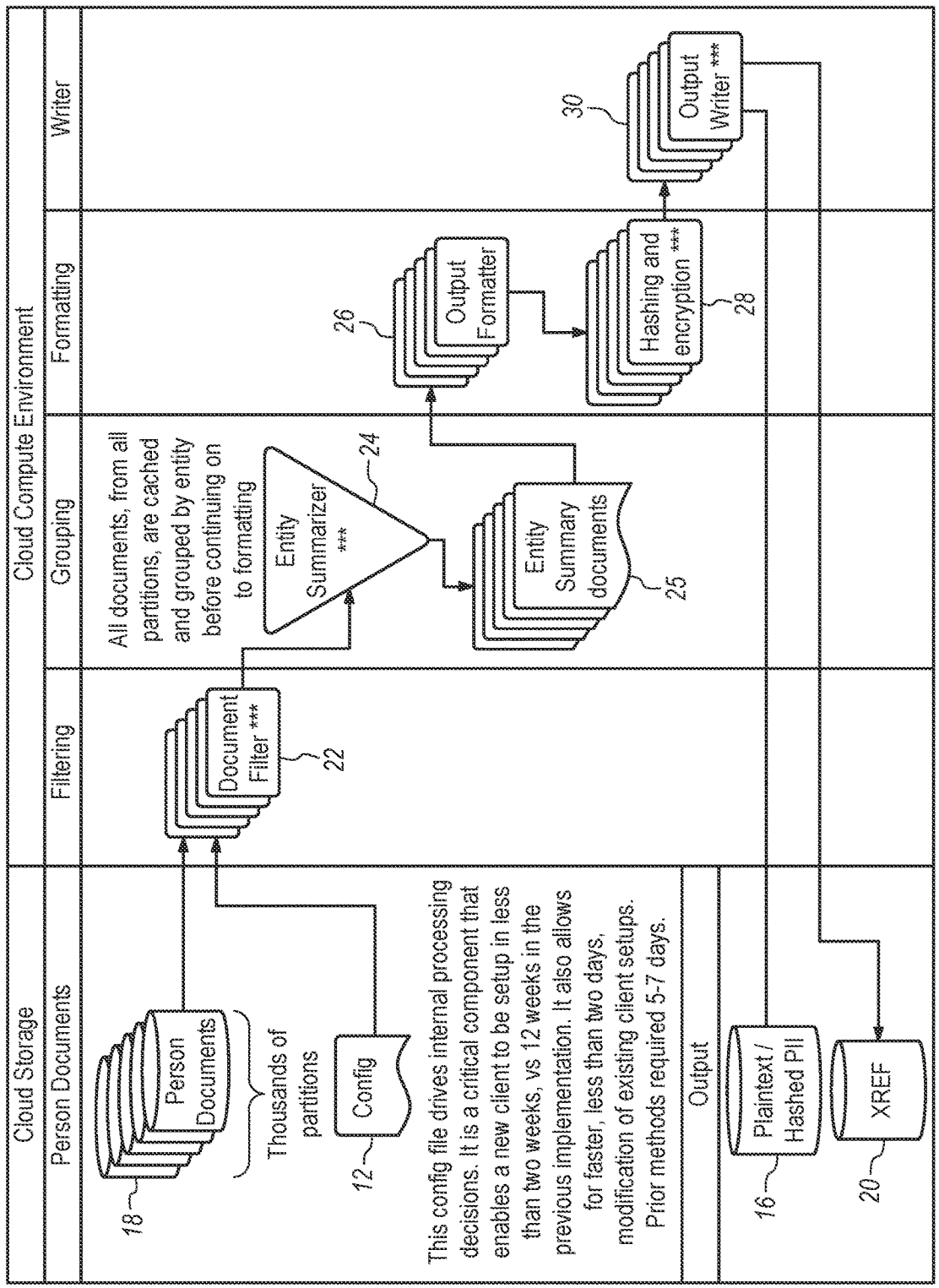
FIG. 3 is a swim lane diagram according to an implementation of the present invention.

Referring now to FIGS. 2 and 3, the component steps of the ERF process may be described in more detail. The Document Table 18 is a periodically refreshed data graph, or alternatively a data store, that feeds ERF with entity data in the form of several different document types. These may include, for example, email, telephone number, name, and postal address information in an identity data graph example as used for illustration here, but the invention is not so limited. This may be supported by, for example, a data graph such as an identity graph. The document table/config file 12 is a configuration file written in JSON that defines what fields are to be delivered to the client and how they should be formatted. Additional delivery information may also be included, non-limiting examples including the name of the output files, the fields that should be included for each file, and the number of partitions that these files should be divided into.

Within the ERF process, the first step is the document filter 22. This step in the process selects the required entity objects and omits those that have usage restrictions. An entity object can be defined as a collection of associated data elements (e.g., email, phone, or postal data) as well as any metadata about these data elements. Data usage restrictions are presented to the document filter as attributes on the entity objects and serve to include or exclude the object in the ERF process for legal or data use agreement purposes. The document filter component is first initialized with the ERF configuration and uses this configuration to determine what entity objects are needed for processing. The document filter then begins any deserialization operations necessary to understand and operate on the incoming entity objects. Only the required entity objects will be allowed to proceed further through the data pipeline. The document filter step is also extensible via Groovy scripts. Groovy is a scripting language with Java-like syntax, the Java® programming language being developed by Oracle Corporation of Austin, Texas. These Groovy scripts may be used to specify a custom programmatic method for entity object inclusion or exclusion. In order to reduce the amount of data that proceeds through the ERF process, the subset of entity object attributes that are needed downstream are pulled out of the entity object to form an entity record. This entity record contains a grouping key which can be tied to an individual across different types of data elements. A rank is also produced which serves as a means of comparing entity records against other entity records in order to determine which is more valuable. Often this ranking is based on the recency of the data that the entity record is based upon and more recently updated records have a higher ranking.

For some ERF configurations, the entity objects are separated by type and grouped within their own sub-pipelines in order to reduce or eliminate entity object duplication for a given data attribute. This allows for only a single entity object to be produced by the document filter that contains a specific phone number, for example.

Various counters are also incremented in the document filter for auditing and validation purposes. These counters track the total number of entity objects that the document filter processes, as well as the total number for a specific entity object type. Comparison of these counters to expected values (such as those from a previous run of the ERF process) serves as a means of process validation.

The second step within the ERF process is the entity summarizer 24. This step groups entity records based on the entity record key mentioned in the document filter description above. This key will pull in entity records that represent multiple types of data attributes (e.g., email, phone, postal) and group them together into an entity summary. Once this grouping is made, the entity records are then sorted based on the ranking that was created by the document filter. This allows for the top N data attributes to be provided in the output client file, where N is the number of attributes requested in the client configuration. A maximum of 1000 entity records can be used to form an entity summary and any excess records are dropped in the entity summarizer.

In addition to grouping and sorting entity records by rank, the entity summarizer is also responsible for creating any new data attributes that are defined in the client configuration. These new data attributes may be created using permutations of the other data attributes that are present in the entity summary. When constructing such a permutation, the ERF configuration defines which data attributes are required to be populated, or non-empty, in order to create a useful permutation of the individual data attributes.

Data attributes can also be reformatted, or normalized, according to the ERF configuration. The most common forms of these are converting the attributes to upper or lower case. Similar to the operation of the document filter, the entity summarizer ERF component is also extensible through the use of Groovy scripts. These scripts can define custom reformatting operations to transform individual attributes, or custom permutations that are built using many different attributes within the entity summary object.

The final result of the entity summarizer component is an entity summary object that represents the required data attributes in the appropriate numbers according to the ERF configuration that is used in the implementation.

The third step within the ERF process is the output formatter 26. This step in the process receives the entity summary objects that are produced by the entity summarizer and serializes them into sets of delimited records to be written out to a file. The data attributes and string delimiter that are used for formatting the individual records are defined by the ERF file configuration. Data elements can be a subset of the full set of fields that are accumulated within an entity summary object. As defined by the ERF configuration file, each ERF can produce one or more final output files and each of these files can receive a different subset of the total fields that are available in the entity summary object.

As individual data elements are pulled from the entity summary object, the hashing/encryption step 28 also performs any necessary hashing and/or encryption to the raw data as defined in the ERF configuration file. Examples of this include MD5, SHA1, SHA256, and AES256 algorithms. It is required that the application of hashing and encryption algorithms be configurable at the individual data element level.

The final output from the hashing/encryption step 28 is a set of key value pairs where the key represents the target output filename and the value is the final formatted output record that should be written to that file.

The final step in the ERF process is the output writer 30 which is responsible for taking the key (filename) and values (records) pairs and writing them to a cloud storage location 10. Filters are applied internally within the workflow to ensure that each file, or set of files, contains only the data records that should be associated with it. The output writer also ensures that the full dataset is partitioned into a configurable, as defined by the ERF configuration file, number of smaller files to ensure easier consumption by the client as it is needed. In cases where XREF files 20 are generated, they are delivered to the information services provider and only used internally, while the hashed PII file 16 is delivered to the client.

The system shown in FIGS. 2 and 3 may be implemented, for example, to utilize standard n1-highmem-8 (i.e., 8 vCPUs, 52 GB memory, and 128 GB of persistence disk space) compute instances in a cloud computing environment. In various embodiments, however, the systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for sharing information without revealing personally identifiable information (PII) from a client computing system operating within a cloud-computing environment comprising a plurality of virtual machines, the method comprising the steps of:

at an information service provider computing system, constructing a configuration, wherein the configuration comprises a filter parameter, an output fields parameter, and an output files parameter;

performing a document filter, wherein a set of objects from a document table are partitioned into multiple document table partitions, each of which are filtered in parallel on a plurality of virtual machines executing simultaneously in the cloud-computing environment to omit restricted objects according to the filter parameter of the configuration to produce a set of filtered objects;

performing an entity summarizer, wherein the filtered objects in the multiple document table partitions are grouped based on a link associated with the object in the document table, and wherein a ranked summary of the requested fields is constructed based on the output fields parameter of the configuration;

performing an output formatter, wherein the ranked summary of the requested fields is applied to the filtered objects to produce formatted filtered objects based on the output files parameter of the configuration;

performing an output writer, wherein the formatted filtered objects are divided into a plurality of output file partitions according to the output files parameter of the configuration, wherein a size of each of the plurality of output file partitions is determined based on a file-size capability of the client system;

transmitting the plurality of output file partitions to the client system, the client system comprising a client data graph comprising a plurality of client objects;

at the client system, using the plurality of output file partitions to match client objects in the client data graph with corresponding client-specific keys; and appending the client-specific keys to the corresponding client objects in the client data graph, wherein no PII is sent from the client system to the information service provider computing system, thereby preventing any inadvertent disclosure of PII outside of the client system.

2. The method of claim 1, wherein the step of performing the output writer further comprises the step of compressing the formatted filtered objects.

3. The method of claim 1, wherein the formatted filtered objects each comprise a client-specific key, wherein the set of client-specific keys comprises one and only one key for each object in the document table.

4. The method of claim 3, further comprising the step of, after performing the output writer, constructing an XREF file comprising a table of internal keys and matched client-specific keys.

5. The method of claim 4, wherein the output fields parameter further comprises a description of fields to be included in the formatted filtered objects.

6. The method of claim 5, wherein the description of fields to be included in the formatted filtered objects comprises a number of at least one field type to be included in the formatted filtered objects.

7. The method of claim 5, wherein the output fields parameter further comprises a type of encryption to be applied to the objects from within the set of objects.

8. The method of claim 5, wherein the output fields parameter further comprises a description of keys to be included with the objects from within the set of objects.

9. The method of claim 8, wherein the description of keys to be included comprises the internal keys.

10. The method of claim 9, wherein the description of keys to be included comprises the client-specific keys.

11. The method of claim 4, wherein the client-specific keys comprise a string concatenated with a salt.

12. The method of claim 1, wherein the filter parameter further comprises a description of a population of objects to be selected from the document table.

13. The method of claim 12, wherein the filter parameter comprises a restriction on objects approved only for distribution of hashed object representations.

14. The method of claim 1, wherein the output file partitions comprise no unencrypted PII.

15. The method of claim 1, further comprising the step of sending an enhancement request from the client system to the information provider system, wherein the request comprises a set of client-specific keys.

16. The method of claim 15, further comprising the step of, at the information provider system, receiving the enhancement request and applying the XREF table to convert the client-specific keys to the corresponding internal keys.

17. The method of claim 1, wherein the configuration comprises an entity resolution file (ERF) data file.

18. A system for providing enhancement data in a data graph at a client system, the system comprising an information service provider computer system operating within a cloud-computing environment comprising a plurality of virtual machines, the information service provider computer system comprising one or more processors and a non-transitory computer readable medium having stored thereon software instructions that, when executed by the one or more processors, cause the one or more processors to:
- construct a configuration, wherein the configuration comprises a filter parameter, an output fields parameter, and an output files parameter;
- perform a document filter, wherein a set of objects from the data graph are partitioned into multiple document table partitions, each of which are filtered in parallel on a plurality of virtual machines executing simultaneously in the cloud-computing environment to omit restricted objects according to the filter parameter of the configuration to produce a set of filtered objects;
- execute an entity summarizer, wherein the filtered objects in the multiple document table partitions are grouped based on a link associated with the object in the data graph, and wherein a ranked summary of the requested fields is constructed based on the output fields parameter of the configuration;
- execute an output formatter, wherein the ranked summary of the requested fields is applied to the filtered objects to produce formatted filtered objects based on the output files parameter of the configuration;
- execute an output writer, wherein the formatted filtered objects are divided into a plurality of output file partitions according to the output files parameter of the configuration, further wherein a size of each of the plurality of output file partitions is determined based on a file-size capability of the client system, and further wherein the output file partitions comprise no unencrypted personally identifiable information; and
- transmit the plurality of output file partitions to the client system,
- wherein the information service provider computer system is configured to not receive PII from the client system, thereby preventing any inadvertent disclosure of PII outside of the client system.

19. The system of claim 18, wherein the software instructions, when executed by the one or more processors, further cause the one or more processors to construct a cross-reference file comprising a set of internal keys and a corresponding set of client keys, and apply the cross-reference file to the output file partitions to match a set of client objects in a client data graph with the set of client keys.

20. The system of claim 18, wherein the client system operates within a cloud-computing environment comprising a plurality of virtual machines, the client system comprising one or more processors and a non-transitory computer readable medium having stored thereon software instructions that, when executed by the one or more processors, cause the one or more processors to:
- use the plurality of output file partitions to match client objects in the client data graph with corresponding client-specific keys; and
- append the client-specific keys to the corresponding client objects in the client data graph.

* * * * *